Patented Mar. 2, 1943

2,312,698

UNITED STATES PATENT OFFICE 2,312,698

SULPHAMYLARYLAMINO TRIAZINES

Gaetano F. D'Alelio, Pittsfield, Mass., assignor to General Electric Company, a corporation of New York No Drawing. Application November 28, 1941, Serial No. 420,861

15 Claims. (Cl. 260—248)

This invention relates to new chemical compounds and more particularly to triazine derivatives. The invention is concerned especially with the production of new and useful sulphamylarylamino triazines.

The triazine derivatives of this invention may be represented graphically by the following general formula:

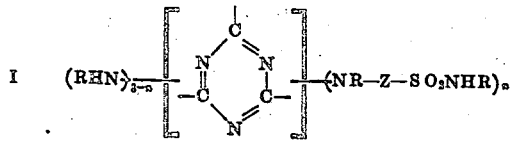

In the above formula $n$ represents an integer and is at least 1 and not more than 3, Z represents an aryl nucleus, and R represents a member of the class consisting of hydrogen and monovalent hydrocarbon and substituted hydrocarbon radicals, more particularly halohydrocarbon radicals. From a consideration of the formula it will be seen that when $n$ is three there will be no amino (—NHR) groups attached to the triazine nucleus.

Illustrative examples of monovalent radicals that R in the above formula may represent are aliphatic (e. g., methyl, ethyl, propyl, isopropyl, allyl, butyl, isobutyl, secondary butyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, allylphenyl, 2-butenylphenyl, propylphenyl, isopropylphenyl, etc.); aryl-substituted aliphatic (e. g., benzyl, phenylethyl, phenylpropyl, cinnamyl, etc.); and their homologues, as well as those groups with one or more of their hydrogen atoms substituted by, for example, a halogen. Specific examples of halo-hydrocarbon radicals are chlorophenyl, chlorocyclohexyl, chloroethyl, dichlorophenyl, ethylchlorophenyl, phenylchloropropyl, bromobutyl, bromotolyl, etc. Preferably R is hydrogen.

Illustrative examples of aryl nuclei that Z in Formula I may represent are: benzene; aliphatic-substituted benzenes, e. g., the ortho-, meta- and para-toluenes, the xylenes, the ethylbenzenes, the propylbenzenes, etc.; the aromatic-substituted benzenes, e. g., phenylbenzene, etc.; naphthalene; the aliphatic-substituted naphthalenes, e. g., the mono-, di- and tri-methyl naphthalenes, the mono-, di- and tri-ethyl naphthalenes, the mono-, di- and tri-propyl naphthalenes, etc.; the aromatic-substituted naphthalenes, e. g., the phenyl naphthalenes, etc.; and others, including halogenated (e. g., chlorinated, brominated, etc.) aryl nuclei.

The new chemical compounds of this invention may be used as pharmaceuticals. They are especially useful and valuable in the preparation of synthetic resinous compositions, since they combine in one compound the advantages of the aminoarylsulphonamides and the triazines. Thus, they may be condensed with, for instance, aldehydes, including polymeric aldehydes and aldehyde-addition products, to yield condensation products of particular utility in the plastics and coating arts. Such condensation products are more fully described and are specifically claimed in my copending application Serial No. 420,860, filed Nov. 28, 1941, and assigned to the same assignee as the present invention.

Various methods may be employed to produce the chemical compounds of this invention, several of which are described below:

METHOD 1

This method comprises effecting reaction between a triamino [(—NHR)₃] triazine and an aminoarylsulphonamide. This reaction may be represented by the following general equation:

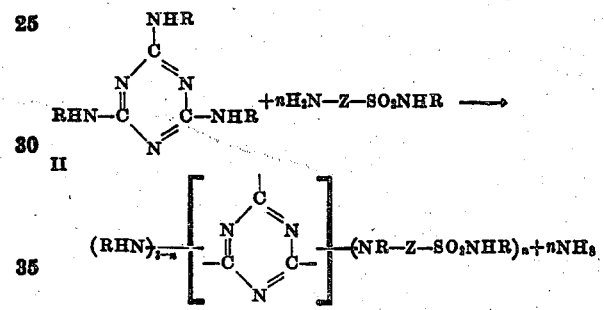

In the above equation $n$, Z and R have the same meanings as given above with reference to Formula I. This reaction preferably is carried out in an inert organic solvent having a boiling point above 150° C., for example ethylene glycol.

Illustrative examples of aminotriazines that may be used, depending upon the particular end-products desired, are the following triamino (—NHR)₃ symmetrical triazines (s-triazines):

2,4,6-triamino s-triazine
2,4,6-tri-(methylamino) s-triazine
2,4,6-tri-(phenylamino) s-triazine
2,4,6-tri-(chlorophenyl) s-triazine
2,4-diamino 6-ethylamino s-triazine
2-amino 4,6-di-(benzylamino) s-triazine
2,4,6-tri-(allylamino) s-triazine
2,4-diamino 6-naphthylamino s-triazine
2,4-diamino 6-toluido s-triazine
2-amino 4,6-di-(chlorophenylamino) s-triazine
2,4-diamino 6-chlorobutylamino s-triazine
2,4-diamino 6-cyclohexylamino s-triazine Illustrative examples of aminoarylsulphonamides that may be employed, depending upon the particular sulphamylarylamido substituent to be introduced into the triazine nucleus, are the following:

The aminobenzenesulphonamides
The aminotoluenesulphonamides
The aminoxylenesulphonamides
The aminonaphthalene sulphonamides
The aminobenzenesulphonyl-methylamides
The aminotoluenesulphonyl-ethylamides
The aminoxylenesulphonyl-propylamides
The aminonaphthalenesulphonyl-butylamides
The aminobenzenesulphonyl-allylamides
The aminobenzenesulphonyl-phenylamides (the aminobenzenesulphanilides)
The aminotoluenesulphonyl-benzylamides
The aminotoluenesulphonyl-cyclohexylamides
The aminoxylenesulphonyl-tolylamides
The aminonaphthalenesulphonyl-chlorophenylamides
The aminobenzenesulphonyl-chlorobutylamides
The aminobenzenesulphonyl-phenylethylamides
The aminobenzenesulphonyl-propylphenylamides The following example illustrates the preparation of para-sulphamylanilino diamino s-triazine by the above-described method. All parts are by weight.

Example 1

|   | Parts |
|---|---|
| Melamine | 126 |
| Sulphanilamide | 172 |

The above reactants were mixed and added to approximately 500 parts of ethylene glycol. The mixture was heated on an oil bath maintained at 160° C. for 6½ hours and then at 180° C. for 28½ hours. The reaction vessel was provided with a reflux condenser which was so cooled that all the vapors except the ammonia evolved during the reaction were condensed and returned to the vessel. After cooling, the reaction mass was poured into about 3,000 parts of cold water to precipitate the para-sulphamylanilino diamino s-triazine resulting from the reaction. A yield of 178 parts of light brown crystals having a melting point of 250° to 255° C. was obtained. Subsequent recrystallization from hot water produced white crystals.

The following equation illustrates the above reaction:

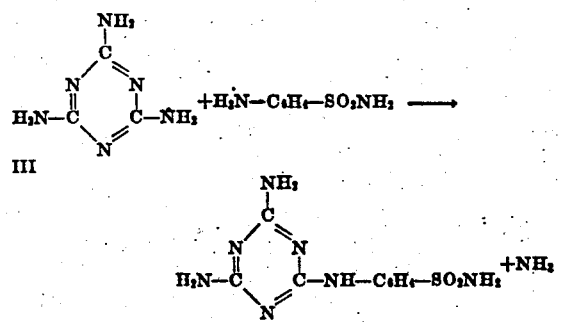

METHOD 2

Another suitable method of preparing the novel compounds of this invention comprises effecting reaction between an aminoarylsulphonamide and a halogenated s-triazine (that is, a triazine having a halogen atom attached directly to a carbon atom of the triazine nucleus). This reaction may be represented by the following general equation:

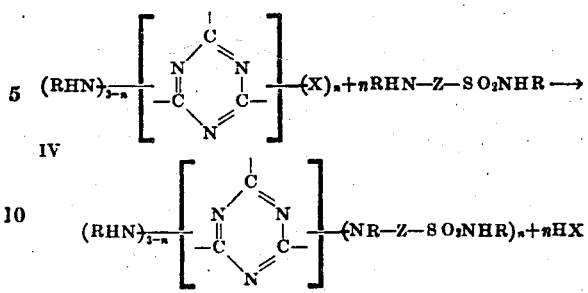

In the above equation X represents a halogen, and $n$, Z and R have the same meanings as given above with reference to Formula I. This reaction advantageously is carried out in an anhydrous liquid medium, for example ether, benzene, alcohol, etc. After the reaction has been completed and the crude product obtained, the latter is suitably treated to remove the hydrohalide, for example by washing with a dilute aqueous solution of a base such as sodium or potassium hydroxide.

Illustrative examples of halogenated s-triazines that may be used, depending upon the particular end-product sought, are listed below:

2-chloro 4,6-diamino s-triazine
2-bromo 4,6-diamino s-triazine
2,4-dichloro 6-amino s-triazine
2,4,6-trichloro s-triazine
2,4,6-tribromo s-triazine
2-iodo 4,6-diamino s-triazine
2-chloro 4,6-di-(ethylamino) s-triazine
2,4-dichloro 6-phenylamino s-triazine
2-chloro 4-ethylamino 6-amino s-triazine.
2-chloro 4-ethylamino 6-phenylamino s-triazine
2-bromo 4,6-di-(cyclohexylamino) s-triazine.
2-chloro 4,6-di-(chlorophenylamino) s-triazine
2-chloro 4-benzylamino 6-amino s-triazine
2-chloro 4,6-di-(toluido) s-triazine Examples of aminoarylsulphonamides that may be used are such as those mentioned above with reference to Method 1. Additional examples are arylsulphonamides such as mentioned in connection with Method 1 but wherein one of the hydrogen atoms of the amino grouping has been replaced by a hydrocarbon or halo-hydrocarbon radical, numerous examples of which radicals have been given above with reference to R of Formula I.

The following examples illustrate the preparation of chemical compounds of this invention in accordance with Method 2.

Example 2

*Preparation of para-sulphamylanilino diamino s-triazine*

One mol of 2-chloro, 4,6-diamino s-triazine and one mol of para-aminobenzenesulphonamide in ethylene glycol or other suitable anhydrous liquid medium are stirred together for from 15 to 24 hours at or below room temperature. The reaction product (para-sulphamylanilino diamino s-triazine) is completely precipitated from the liquid medium by the addition of a liquid which is miscible with the anhydrous liquid medium but a non-solvent for the reaction product, e. g., ethyl alcohol. The product is washed free from non-volatile contaminants and dried. The dried compound is stirred with a dilute caustic solution, for example a 5% sodium hydroxide solution, to free the amino or amido groups of the product from any hydrochloride salt that may have formed during the reaction. The para-sulphamylanilino diamino s-triazine thus obtained may be purified further, if desired, by recrystallization from boiling water.

EXAMPLE 3

*Preparation of 2,4,6-tri-(para-sulphamylanilino) s-triazine*

The same procedure is followed as described under Example 2 with the exception that the halogenated triazine is 2,4,6-trichloro s-triazine and the para-aminobenzenesulphonamide is employed in an amount corresponding to 3 mols of the said sulphonamide per mol of the said halogenated triazine. This reaction may be represented by the following equation:

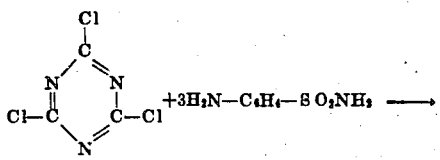

V

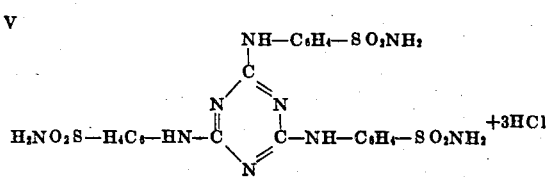

The di-(sulphamylanilino) amino s-triazines are prepared in essentially the same manner as described under Example 2 using 2,4-dichloro amino s-triazine as a starting reactant and the proper molar amount of the aminobenzenesulphonamide reactant. For example, di-(meta-sulphamylanilino) amino s-triazine is prepared by effecting reaction as described under Example 2 between meta-aminobenzenesulphonamide and 2,4-dichloro amino s-triazine in the ratio of at least 2 mols of the former per mol of the latter.

The new chemical compounds of this invention, all of which contain at least one sulphamylarylamino group attached to the triazine nucleus, also may be prepared by causing a polyhalogenated s-triazine to react with an aminoarylsulphonamide in an amount insufficient to react with all of the halogen atoms of the halogenated triazine. The resulting product then is caused to react with ammonia or with an amine to yield various sulphamylarylamino s-triazines.

METHOD 3

Another method, which is applicable only to the preparation of tri-(sulphamylarylamino)-substituted triazines, involves the reaction of a cyanogen halide with an aminoarylsulphonamide. It is not known whether the reaction involves the reaction of the cyanogen halide with the aminoarylsulphonamide to form a substituted cyanamide which then trimerizes to the substituted triazine or whether the reaction involves the trimerization of the cyanogen halide to a cyanuric halide which then reacts with the aminoarylsulphonamide as outlined under Method 2. The reaction may be represented by the following equation:

VI    $3CNX + 3RHN-Z-SO_2NHR \longrightarrow$

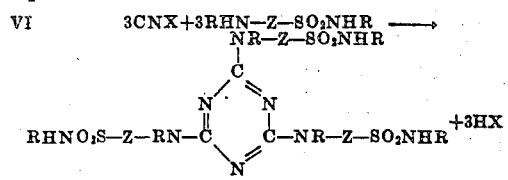

In the above equation X represents a halogen, and Z and R have the same meanings as given above with reference to Formula I.

METHOD 4

Another method which is especially suitable for use in preparing the new chemical compounds of this invention comprises effecting reaction between (1) an aminoarylsulphonamide having the general formula $RHN-Z-SO_2NHR$, where R and Z have the same meanings as given above with reference to Formula I, and (2) a triazinyl aliphatic thioether selected from the class consisting of (a) mono-triazinyl aliphatic thioethers corresponding to the general formula

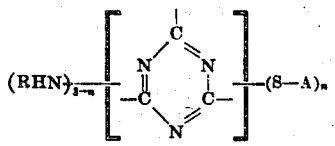

VII where A represents a monovalent aliphatic hydrocarbon radical, and $n$ and R have the same meanings as given above with reference to Formula I, and (b) bis-triazinyl aliphatic thioethers corresponding to the general formula

VIII

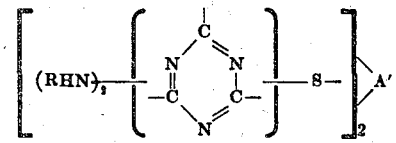

where A' represents a divalent aliphatic hydrocarbon radical selected from the class of radicals represented by B and $(B-O-)_m-B'$, where B and B' represent divalent aliphatic hydrocarbon radicals, R has the same meaning as given above with reference to general Formula I, and $m$ is a small integer, e. g., from 1 to 5. When a mono-triazinyl aliphatic thioether is used as a starting reactant, the reaction may be represented by the following general equation:

$$(RHN)_{3-n}\left[\begin{array}{c}\text{triazine ring}\end{array}\right]-(S-A)_n + nRHN-Z-SO_2NHR \longrightarrow$$

IX $$(RHN)_{3-n}\left[\begin{array}{c}\text{triazine ring}\end{array}\right]-(NR-Z-SO_2NHR)_n + nA-SH$$

When a bis-triazinyl aliphatic thioether, e. g., a symmetrical bis-(diamino s-triazinyl thio) dialkyl ether, is used as a starting reactant, the reaction may be represented by the following general equation:

$$\left[(RHN)_2\left[\begin{array}{c}\text{triazine}\end{array}\right]-S-\right]_2 A' + 2RHN-Z-SO_2NHR \rightarrow$$

X $$2(RHN)_2\left[\begin{array}{c}\text{triazine}\end{array}\right]-NR-Z-SO_2NHR + HS-A'-SH$$

In Equations IX and X, A and A' have the same meanings as given above with reference to Formulas VII and VIII, respectively, and n (Equation IX), R and Z have the same meanings as given above with reference to Formula I. The reactions represented by Equations IX and X are best carried out in a solvent for the reactants, e. g., a mixture of dioxane and water, and at the reflux temperature of the mass.

Illustrative examples of mono-triazinyl aliphatic thioethers that may be used, depending upon the particular product sought, are listed below:

2-ethylthio 4,6-diamino s-triazine
2-butylthio 4,6-di-(methylamino) s-triazine
2-allylthio 4,6-di-(anilino) s-triazine
2-methylthio 4-ethylamino 6-amino s-triazine
2-(3'-butenylthio) 4-toluido 6-benzylamino s-triazine
2-propylthio 4-chloroanilino 6-chlorobutylamino s-triazine
2,4-di-(ethylthio) 6-amino s-triazine
2-methylthio 4-propylthio 6-methylamino s-triazine
2,4-di-(allylthio) 6-anilino s-triazine
2,4,6-tri-(butylthio) s-triazine
2-methylthio 4-ethylthio 6-propylthio s-triazine
2,4,6-tri-(3'-butenylthio) s-triazine
2,4,6-tri-(ethylthio) s-triazine Illustrative examples of bis-triazinyl aliphatic thioethers that may be employed, depending upon the particular end-product desired, are shown below:

Alpha, beta-bis-(diamino s-triazinyl thio) ethane
Alpha, gamma-bis-(diamino s-triazinyl thio) propane
Alpha, omega-bis-(diamino s-triazinyl thio) butane
Alpha, gamma-bis-[4,6 - di - (ethylamino) s-triazinyl-2 thio] propane
Alpha, omega-bis-[4,6-di-(anilino) s-triazinyl-2 thio] butane
Beta, gamma-bis-[4,6 - di - (benzylamino) s-triazinyl-2 thio] butane
Alpha, beta-bis-(4-allylamino 6-chloroanilino s-triazinyl-2 thio) ethylene
Alpha, alpha-bis-(4-toluido 6-amino s-triazinyl-2 thio) ethane
Beta, beta'-bis-(diamino s-triazinyl thio) diethyl ether
Beta, beta' - bis - (4 - methylamino 6 - naphthylamino s-triazinyl-2 thio) di-isopropyl ether
Alpha, beta-bis-(diamino s-triazinyl thio) ethylene
Alpha, alpha - bis - (diamino s - triazinyl thio) ethane
Gamma, gamma'-bis-(diamino s-triazinyl thio) dipropyl ether
Beta, beta'-bis-(diamino s-triazinyl thio) di-isobutyl ether Examples of aminoarylsulphonamides that may be used are such as those mentioned above with reference to Methods 1 and 2.

The following example illustrates the preparation of a novel chemical compound of this invention in accordance with Method 4. All parts are by weight.

EXAMPLE 4

Preparation of para-sulphamylanilino diamino s-triazine

|  | Parts | Approx. mol ratio |
|---|---|---|
| Beta, beta'-bis-(diamino s-triazinyl thio) diethyl ether | 11.5 | 1 |
| Para-aminobenzenesulphonamide | 11.0 | 2 |

The above components were dissolved in a boiling solution of equal parts dioxane and water. The solution was heated under reflux at the boiling temperature of the mass for 13 hours. At the end of the reaction period just enough warm water was added to the hot reaction mass to cause incipient crystallization to take place. After cooling the mass to room temperature, the crude product (para-sulphamylanilino diamino s-triazine) was filtered off. A purified material having a melting point of 253° C. was obtained by recrystallizing the crude product from a hot mixture of dioxane and water.

The following equation represents the reaction:

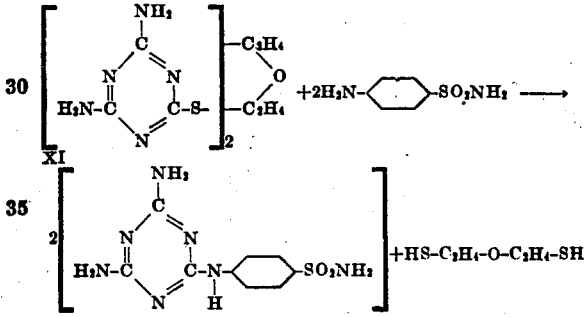

Meta-sulphamylanilino diamino s-triazine is produced as described above with reference to the production of para-sulphamylanilino diamino s-triazine with the exception that meta-aminobenzene sulphonamide is used as a starting reactant instead of para-aminobenzenesulphonamide.

It will be noted that in the reaction represented by Equation XI a mono-(sulphamylarylamino) diamino s-triazine, specifically para-sulphamylanilino diamino s-triazine, is prepared by effecting reaction between an aminoarylsulphonamide, more particularly para-aminobenzenesulphonamide, and a symmetrical bis-(diamino s-triazinyl thio) dialkyl ether, specifically beta, beta'-bis-(diamino s-triazinyl thio) diethyl ether, in the ratio of at least two mols of the former to one mol of the latter.

From the foregoing description it will be seen that the present invention provides new and useful sulphamylarylamino triazines, examples of which are the tri-(sulphamylarylamino) s-triazines, the monoamino (—NHR) di-(sulphamylarylamino) s-triazines and the diamino [(—NHR)₂] mono-(sulphamylarylamino) s-triazines. Other and more specific examples of these new compounds are listed below:

Ortho-sulphamylanilino diamino s-triazine
Meta-sulphamylanilino diamino s-triazine
Para-sulphoamyltoluido diamino s-triazine
2-(meta-sulphamyltoluido) 4,6-di-(ethylamino) s-triazine
Di-(ortho-sulphamylanilino) amino s-triazine
Di-(meta-sulphamylanilino) amino s-triazine
Di-(para-sulphamylanilino) amino s-triazine Di-(para-sulphamyltoluido) amino s-triazine
2,4,6-tri-(ortho-sulphamylanilino) s-triazine
2,4,6-tri-(meta-sulphamylanilino) s-triazine
2,4,6-tri-(para-sulphamylanilino) s-triazine
2,4,6-tri-(para-sulphamyltoluido) s-triazine
2,4,6-tri-(meta-sulphamylxylidino) s-triazine
2 - (para - sulphamyltoluido) 4,6 - di - (methylamino) s-triazine
2 - [para - (phenylsulphamyl) - xylidino] 4,6 - di-(anilino) s-triazine
2 - [para - (methylsulphamyl) - benzylamino] 4-methylamino 6-amino s-triazine
2 - [para - (benzylsulphamyl) - chloroanilino] 4-toluido 6-benzylamino s-triazine
2 - [para - (tolylsulphamyl) - ethylanilino] 4 - chloroanilino 6-amino s-triazine
2 - (4' - sulphamylnaphthyl - 1' - amino - 4,6 - diamino s-triazine
2 - [para - sulphamylphenyl - (methyl) -amino] 4,6-diamino s-triazine
2 - (ortho - sulphamylanilino) 4 - (3' - butenylamino) 6-chlorobutylamino s-triazine
2 - [meta - sulphamyltolyl - (phenyl) - amino] 4 - (ethyl - chloroanilino) 6 - (chlorobutyl - anilino) s-triazine
2,4 - di - (ortho - sulphamylanilino) 6 - methylamino s-triazine
2,4 - di - (meta - sulphamylanilino) 6 - anilino s-triazine
2,4 - di - (para - sulphamyltoluido) 6 - benzylamino s-triazine
2,4 - di - (para - sulphamylxylidino) 6 - chloroanilino s-triazine
2 - (para - sulphamylanilino) 4 - (ortho - sulphamylanilino) 6-amino s-triazine
2 - (para - sulphamylanilino) 4 - (para-sulphamyltoluido) 6-methylamino s-triazine
2 - (ortho - sulphamylanilino) 4 - (meta-sulphamylanilino) 6-(para-sulphamylanilino) s-triazine
2 - (para - sulphamylanilino) 4,6 - di - (cyclohexylamino) s-triazine
2 - (meta - sulphamylanilino) 4,6 - di - (chlorophenylamino) s-triazine
2 - (para - sulphamylanilino) 4,6 - di - (chloronaphthylamino) s-triazine In a manner similar to that described above with particular reference to the production of sulphamylarylamino 1,3,5- or symmetrical triazines (s-triazines), the corresponding sulphamylarylamino 1,2,4- or asymmetrical triazines (a-triazines) and the 1,2,3- or vicinal triazines (v-triazines) may be prepared.

What I claim as new and desire to secure by Letters Patent of the United States is:

1. Chemical compounds corresponding to the general formula

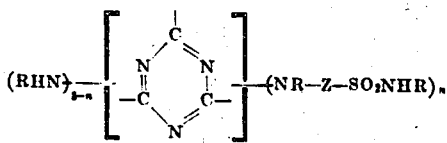

where $n$ represents an integer and is at least 1 and not more than 3, Z represents an aryl nucleus, and R represents a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein Z represents a benzene nucleus.

4. Chemical compounds as in claim 1 wherein R represents hydrogen and Z represents a benzene nucleus.

5. A di-(sulphamylanilino) amino s-triazine.

6. Di-(meta-sulphamylanilino) amino s-triazine.

7. Chemical compounds as in claim 1 wherein R represents hydrogen and $n$ is 1.

8. Chemical compounds as in claim 1 wherein R represents hydrogen, $n$ is 1, and Z represents a benzene nucleus.

9. A sulphamylanilino diamino s-triazine.

10. Para-sulphamylanilino diamino s-triazine.

11. Meta-sulphamylanilino diamino s-triazine.

12. The method of preparing chemical compounds corresponding to the general formula

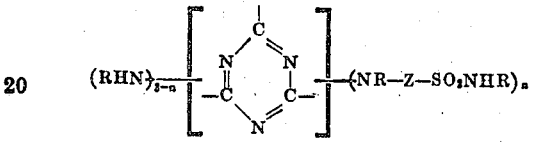

where $n$ represents an integer and is at least 1 and not more than 3, Z represents an aryl nucleus, and R represents a member of the class consisting of hydrogen and monovalent hydrocarbon and halo-hydrocarbon radicals, said method comprising effecting reaction between (1) an aminoarylsulphonamide corresponding to the general formula RHN—Z—SO₂NHR, where R and Z have the meanings above given, and (2) a triazinyl aliphatic thioether selected from the class consisting of (a) mono-triazinyl aliphatic thioethers corresponding to the general formula

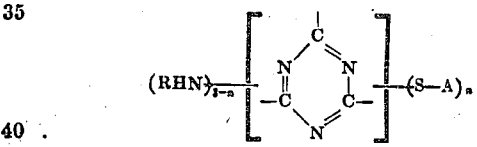

where A represents a monovalent aliphatic hydrocarbon radical, and $n$ and R have the meanings above given, and (b) bis-triazinyl aliphatic thioethers corresponding to the general formula

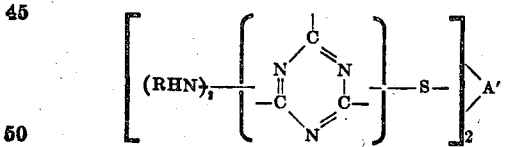

where A' represents a divalent aliphatic hydrocarbon radical selected from the class of radicals represented by B and (B—O—)$_m$—B', where B and B' represent divalent aliphatic hydrocarbon radicals, $m$ is a small integer and is at least 1, and R has the meaning above given.

13. A method as in claim 12 wherein R represents hydrogen.

14. The method of preparing a mono-(sulphamylarylamino) diamino s-triazine which comprises effecting reaction between an aminoarylsulphonamide and a symmetrical bis-(diamino s-triazinyl thio) dialkyl ether in the ratio of at least two mols of the former to one mol of the latter.

15. The method of preparing para-sulphamylanilino diamino s-triazine which comprises effecting reaction between para-aminobenzenesulphonamide and beta, beta'-bis-(diamino s-triazinyl thio) diethyl ether in the ratio of at least two mols of the former to one mol of the latter.

GAETANO F. D'ALELIO.